United States Patent [19]

Henn

[11] Patent Number: 4,532,316

[45] Date of Patent: Jul. 30, 1985

[54] PHASE SEPARATING POLYURETHANE PREPOLYMERS AND ELASTOMERS PREPARED BY REACTING A POLYOL HAVING A MOLECULAR WEIGHT OF 600–3500 AND ISOCYANATE AND A LOW MOLECULAR WEIGHT CHAIN EXTENDER IN WHICH THE RATIOS OF REACTANTS HAVE A LIMITED RANGE

[75] Inventor: Robert L. Henn, Wilmington, Del.

[73] Assignee: W. L. Gore & Assoc., Inc., Newark, Del.

[21] Appl. No.: 614,131

[22] Filed: May 29, 1984

[51] Int. Cl.$^3$ .............................................. C08G 18/10
[52] U.S. Cl. ...................................... 528/59; 428/423.1; 428/424.6; 528/60; 528/61; 528/63; 528/64; 528/65; 528/66; 528/67; 528/74; 528/75; 528/76; 528/77; 528/80; 528/83
[58] Field of Search ................................. 528/60–59, 528/61, 63, 64, 65, 66, 67, 74, 75, 76, 77, 80, 83; 428/423.1, 424.6

[56] References Cited

U.S. PATENT DOCUMENTS

| | | | |
|---|---|---|---|
| 2,917,486 | 12/1959 | Nelson et al. | 524/99 |
| 3,164,565 | 1/1965 | Calamari | 528/76 |
| 3,471,445 | 10/1969 | Carr | 528/63 |
| 3,901,852 | 8/1975 | Shah | 528/85 |
| 3,915,937 | 10/1975 | O'Shea | 528/65 |
| 4,239,879 | 12/1980 | Fabris et al. | 528/76 |
| 4,273,911 | 6/1981 | Freudenberg et al. | 528/76 |
| 4,321,333 | 3/1982 | Alberino et al. | 528/65 |
| 4,367,327 | 1/1983 | Holker et al. | 528/66 |
| 4,377,645 | 3/1983 | Guthrie et al. | 521/137 |
| 4,381,388 | 4/1983 | Naples | 528/59 |

Primary Examiner—Maurice J. Welsh
Attorney, Agent, or Firm—Mortenson & Uebler

[57] ABSTRACT

Reactive, 100 percent solids, segmented, phase-separating polyurethane prepolymers are provided, being the reaction products of:

(i) a polyol (A) having a number average molecular weight of from about 600 to about 3500 and having a functionality of at least 2;

(ii) an isocyanate (B) having a functionality of at least 2; and (iii) a low molecular weight chain extender (C) having a molecular weight in a range lower than about 500 and having a functionality of at least 2, characterized in that the above reactants are employed in such proportions as to satisfy the following equations:

$$\frac{Eq_{NCO}}{Eq_{OH} + Eq_{CE}} \geq 1.1 \qquad (a)$$

$$Eq_{OH} \geq Eq_{CE} \qquad (b)$$

$$Eq_{CE} > 0, \qquad (c)$$

wherein $Eq_{NCO}$ is the equivalents of the isocyanate species employed, and $Eq_{OH}$ and $Eq_{CE}$ denote the equivalents, respectively, of the polyol and chain extender. This invention provides the aforesaid novel prepolymers, the processing made possible by the prepolymers, the polyurethane elastomers resulting from the prepolymers and the products made from those elastomers.

59 Claims, 2 Drawing Figures

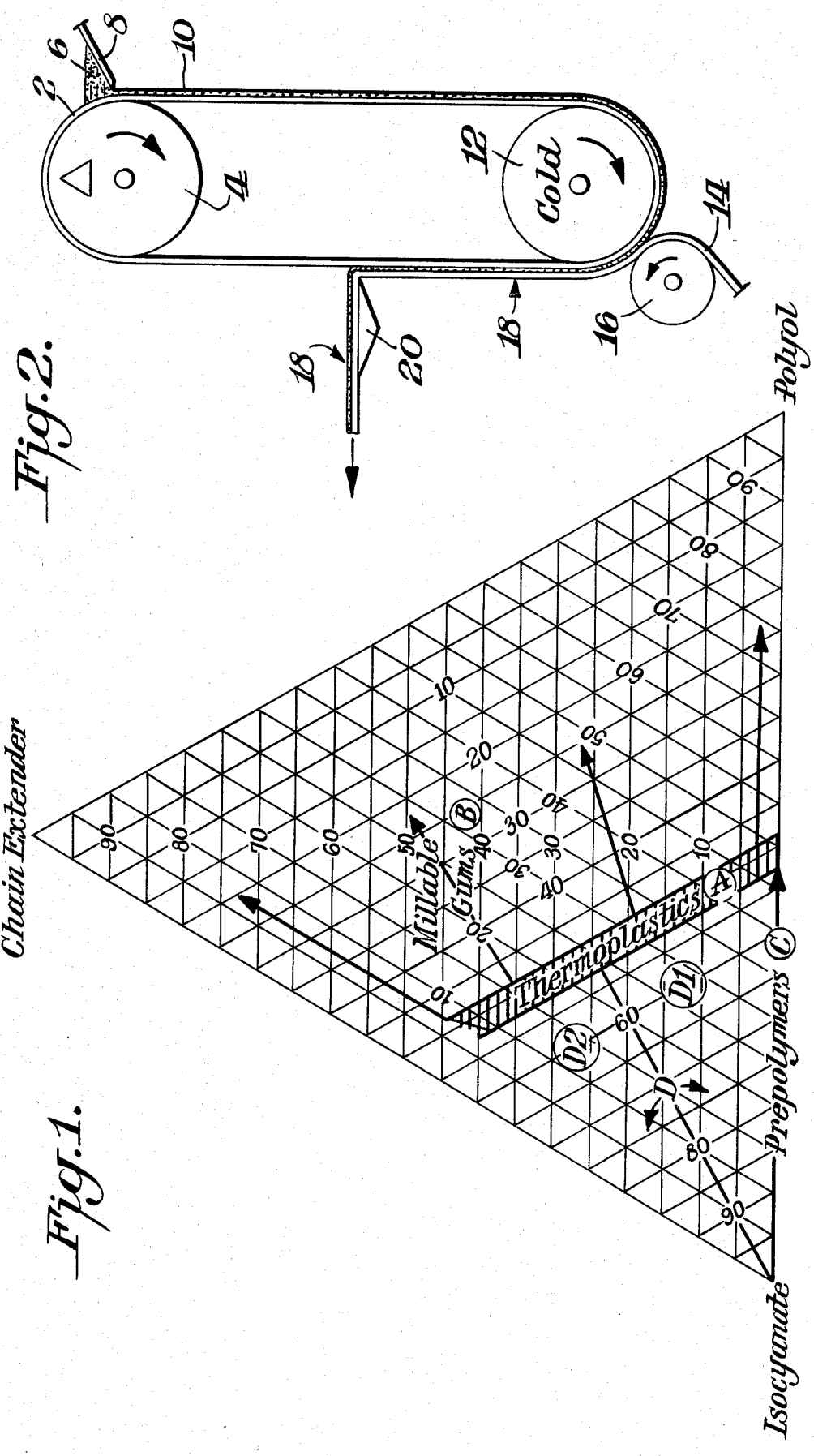

PHASE SEPARATING POLYURETHANE PREPOLYMERS AND ELASTOMERS PREPARED BY REACTING A POLYOL HAVING A MOLECULAR WEIGHT OF 600–3500 AND ISOCYANATE AND A LOW MOLECULAR WEIGHT CHAIN EXTENDER IN WHICH THE RATIOS OF REACTANTS HAVE A LIMITED RANGE

BACKGROUND OF THE INVENTION

This invention relates to reactive, 100 percent solids, segmented, phase-separating, polyether polyurethane prepolymers. More particularly, it relates to the preparation of such prepolymers, the novel properties of the prepolymers, novel processing made possible by the prepolymers, the elastomers resulting from the prepolymers and the products made from the elastomers.

It has heretofore been known to prepare polyurethane polymers having elatomeric properties by three different chemical routes, characterized principally on the basis of processing considerations. (See for instance, Hepburn, C., *Polyurethane Elastomers*, Applied Science Publishing Ltd., 1982 and Saunders & Frisch, *Polyurethanes Chemistry and Technology, Part II. Technology*, Robert E. Krieger Publishing Company, 1983). These three groupings of elastomers are distinguished by processing as a liquid, millable rubber or thermoplastic.

The building blocks generally employed in polyurethane technology, the isocyanate species, the polyol and chain extender are well known in the art. Depending on the equivalency ratios employed using these building blocks, various characteristics are achieved that dictate both the processing techniques to be employed to achieve the final desired product, and the properties of the final product. FIG. 1 illustrates, in a triangular coordinate plot, the percentage equivalents of isocyanate, polyol and chain extender utilized in a general way in prior polyurethane elastomer technology.

Region A of FIG. 1 delineates the equivalency ratios commonly employed to obtain a chain extended, segmented, high molecular weight thermoplastic polyurethane exhibiting elastomeric properties. The theoretical maximum molecular weight in this reaction (one-shot or prepolymer) of difunctional reagents is achieved when the equivalency ratio of diisocyanate to active hydrogen species (polyol and chain extender) is one. Thus, thermoplastic polyurethanes are substantialy centered around the region of 50 percent equivalents of isocyanate.

The thermoplastic route to a solid polyurethane elastomer can be subdivided into two classifications: those completely soluble in certain solvents and containing no chemical crosslinks before and after processing, and those materials possessing no initial crosslinks, but which form a lightly crosslinked structure after a heated post-cure.

The former class is the more predominantly encountered and is most commonly made by the reaction of essentially equivalents of isocyanate and active hydrogen functionality or a slight excess of the active hydrogen component. Products from this class have the drawback in that they are inherently sensitive to particular solvents and will swell extensively in some solvents and dissolve in others. This limits their applications in some areas of application such as coatings, adhesives and sealants.

In the second class of thermoplastic polyurethanes, the synthesis is similar, however, a slight excess of isocyanate is employed to generate a final polymer having a small amount of unreacted isocyanate groups. These isocyanate groups are then available for crosslinking the final polymer through allophonate and biuret formation. The crosslink density is low by this method and the final thermoplastic polyurethane polymer must be given a heated post-cure to "activate" these residual "dormant" isocyanate groups.

The processing of either class of thermoplastic polyurethanes may proceed by melt processing techniques and, in the former class, by solution techniques. Melt processing, such as injection molding, extrusion and calendering, generally requires fairly sophisticated equipment and high temperatures frequently approaching degradation temperatures of the thermoplastic polyurethane itself. As a rule, these products have a high molecular weight and high melting point. Although low melting thermoplastic polyurethanes are known, the strength properties of such polymers, including their tensile strength, percent elongation and tear propagation resistance, are generally poor. Solution systems usually require very polar solvents such as tetrahydrofuran, dimethylformamide, dimethylsulfphoxide, M-Pyrol, which necessitate such concerns as environmental factors, the higher cost for solvents, and energy.

The millable rubber route to a solid polyurethane elastomer falls into Region B of FIG. 1. To allow conventional rubber processing techniques to be applied to the polymers, of this class, the polymers therein are distinguished by their being chain terminated during synthesis by employing an excess of either the chain extender or the polyol, resulting in a storage stable, soluble polymer of lower molecular weight than the thermoplastic polyurethanes. To achieve adequate final physical properties, the prepolymer is generally either further chain extended or crosslinked by employing additional isocyanate, or, where appropriate, cured by sulphur or peroxide.

Liquid processing leading to polyurethanes having elastomeric properties may be further subdivided into the prepolymers existing in Region C of FIG. 1, or those referred to commonly as "casting" systems.

Cast polyurethane elastomers are made by a process wherein the reactants are mixed in the liquid state (prepolymer or one-shot route), the reacting mixture is then fabricated into its final form by an appropriate technique such as casting or molding, and the reaction leading to chain extension/crosslinking continues. Complete cure is typically achieved by a hot air post-cure for three to twenty-four hours at 100° C. In general, after the chain extender has been added and mixed with the prepolymer (or all three components mixed in the one-shot technique), the reaction of these species limit the subsequent pot life to several minutes (see for instance, the improvements provided in U.S. Pat. No. 3,471,445). Because this method involves the mixing of two or more liquids, which are all generally of low molecular weight, it is found that initial physical properties of the system are poor until the curing proceeds to some degree. The equivalency ratios of isocyanate:polyol:chain extender employed in cast polyurethane elastomers places most of these systems close to the region characteristic of thermoplastic polyurethanes, generally with a tendency to a slight excess in isocyanate, although, in principle, these systems may employ quite varied equivalency ratios.

Alternatively to the chain extension of the prepolymer, as discussed previously, the prepolymer, Region C of FIG. 1, has been utilized directly. Curing is normally achieved by chain extension of the prepolymer through the reaction of the isocyanate groups with water and crosslinking by allophanate and biuret formation. It is in this use that a distinguishing feature is observed between the polyester prepolymers and the polyether prepolymers.

The physical form of these prepolymers ranges generally from a viscous liquid to a waxy, low melting solid, dependent usually upon whether a polyether or polyester polyol has been employed, respectively. In general, polyether prepolymer systems do not exhibit any of their final physical properties until substantially along in the cure cycle. Many polyester prepolymer systems, due to the inherent tendency of the polyester segment to crystallize, exhibit many of their final physical properties early in the cure cycle. This processing characteristic of polyether prepolymers limits many of their industrial applications, wherein some integrity, "green strength", low flow or similar characteristics are required.

Another classification of polyurethanes yielding cured polymers having elastomeric properties are those provided by a "blocked" isocyanate, "one-package" method, in which a polyol is employed as a mixture of a polyisocyanate (block isocyanate) masked with a blocking agent. The blocked isocyanate method presents disadvantages in that it requires relatively high temperatures for curing to eliminate the blocking agent. When the blocking agent remains partially in the resulting cured polymer, the agent will adversely affect the physical properties of the elastomer and cause environmental pollution in association with the scattering of the agent. These disadvantages permit limited use of the resulting resin.

Although limited, there are some prior polyurethane elastomers that would fall into the equivalency ratios of isocyanate, polyol and chain extender represented by Region D of FIG. 1. Those elastomers from Region D are generally characterized by having an excess of the isocyanate species. The preponderance of the elastomers from this region are fabricated according to the casting techniques described above. Representative of this class are cast Adiprene/MOCA systems described in Saunders and Frisch, *Polyurethanes Chemistry & Technology, Part II Technology,* Robert E. Krieger Publishing Company, 1983, pps 345, 350. As mentioned, a limitation to the casting technique has been the limited pot life after all reagents are admixed.

Driven by EPA restrictions, the high cost of solvents and the energy to drive them off, as well as the increased awareness of the toxicity of many solvents, the past decade has seen a trend to higher solids systems for adhesives, coatings and so forth. The difficulty in 100 percent solids systems has been in achieving certain physical characteristics such as green strength with processing characteristics that do not necessitate the frequently encountered situation of a need for highly specialized equipment.

U.S. Pat. No. 2,917,486 discloses that an intermediate from the equivalents of Region D may be stored for subsequent later processing by the addition of a stabilizer. The stabilizers prevent premature gelling during storage or processing. Stabilization, however, must later be overcome by the addition of additional isocyanate. It is also recognized in the art to employ acyl halides such as p-nitrobenzoyl chloride, in catalytic amounts, in prepolymers to stabilize against crosslinking during storage and to facilitate processing.

U.S. Pat. No. 3,049,513 provided for ordered, polyester isocyanate terminated components yielding compositions for coatings having superior physical properties than obtained by other, then-available, isocyanate components. Either two component systems, usually in solution, where the polyfunctional isocyanate species was employed as one of the components, or a one component, moisture-cured solution system were provided.

U.S. Pat. No. 4,273,911 discloses low melt temperature processible thermoplastic polyurethanes having acceptable final physical properties by addition of two melting point lowering diol chain extenders and one strength enhancing diol chain extender. Therein, an acceptable compromise between melt behavior and final physical properties is achieved.

Numerous attempts have been made to prepare useful polyurethane elastomers, which are both melt processable and have acceptable final physical properties, from a polyol of polyoxypropylene. See, for instance, U.S. Pat. Nos. 3,915,937 and 4,239,879. Systems having the chemical resistance to hydrolysis of polyether urethanes, and which possess both the economics of low temperature melt processing and lower raw material cost of the poly(oxypropylene)glycol over the commonly employed poly(oxytetramethylene)glycol and acceptable physical characteristics, would be strongly desired.

Likewise, numerous attempts have been made to prepare useful polyurethanes, which are melt processable and have acceptable physical properties, from a polyol of polyoxyethylene. See, for instance, U.S. Pat. No. 3,164,565 or U.S. Pat. No. 3,901,852, where, in the latter reference, successful systems were prepared within the narrow window of both a substantially balanced weight ratio of hard segment to soft segment and an isocyanate to active hydrogen equivalency ratio of approximately 1:1. This is limiting however, particularly when it is desired to produce products wherein the polyoxyethylene content influences other characteristics of desired products, such as hydrophilicity.

U.S. Pat. No. 4,367,327 discloses a film of polyoxyethylene polyurethane to be utilized as a solution cast textile coating providing breathability and waterproofness. A compromise is made between the polyoxyethylene content for breathability and the elastomeric physical properties required for product performance.

Historically it has been difficult to obtain required physical characteristics such as ultimate tensile strength, ultimate elongation, modulus of elasticity, tear strength, and abrasion resistant characteristics in a highly hydrophilic polymeric coating which is useful and commercially attractive. This becomes even more difficult if the economics require melt processability. Specifically, films of highly hydrophilic polymers have tended to be weak and either easily torn or damaged by abrasion and/or flex, especially when swollen with water. Accordingly, there is a current need to produce melt processable systems having increased hydrophilicity without the heretofore concomitant deterioration in physical properties.

It is well known in the art that polyurethane polymers exhibit excellent elastomeric properties, particularly those of the $(AB)_n$ segmented block copolymer type, where the polyol soft segment (A) alternates with the polyurethane hard segment (B). It is widely accepted that the unique properties of these copolymers are directly related to the two-phase microstructure which exists when the hard and soft segments phase-separate, the hard segments forming domains which act as a reinforcing filler and pseudo-crosslink the polymeric network.

Accordingly, it is an object of the present invention to overcome the difficulties alluded to hereinabove and provide storage stable, moderate temperature melt processible, one component, 100 percent solid, reactive polyurethane prepolymers which, when cured, yield elastomers possessing the excellent physical properties typical of the $(AB)_n$ type segmented urethane copolymers.

SUMMARY OF THE INVENTION

A reactive, 100 percent solids, segmented, phase-separating polyurethane prepolymer is provided having soft segments and suitable hard segments, the prepolymer comprising the reaction product of:
(i) a polyol (A) having a number average molecular weight of from about 600 to about 3500 and having a functionality of at least 2;
(ii) an isocyanate (B) having a functionality of at least 2; and
(iii) a low molecular weight chain extender (C) having a molecular weight in a range lower than about 500 and having a functionality of at least 2, wherein the reactants are employed in such proportions so as to satisfy the following equations:

$$\frac{Eq_{NCO}}{Eq_{OH} + Eq_{CE}} \geq 1.1 \quad (a)$$

$$Eq_{OH} \geq Eq_{CE} \quad (b)$$

$$Eq_{CE} > 0, \quad (c)$$

wherein $Eq_{NCO}$ is the equivalent of the isocyanate species employed, and $Eq_{OH}$ and $Eq_{CE}$ denote the respective molar equivalents of the polyol and chain extender employed, the soft segments being provided by the polyol and the suitable hard segments being provided by the reaction product of the isocyanate and chain extender and which induce phase-separation of the hard and soft segments in the prepolymer as a result of thermodynamic incompatibility between the hard and soft segments.

The polyol is selected from the group consisting of poly(alkylene ethers), polyesters, polycaprolactones, hydroxyl terminated polyester-amides, polycarbonates, polybutadienes or copolymers thereof.

Preferred is the reaction product of:
(i) a polyol (A) having a number average molecular weight of from about 600 to about 3500;
(ii) a diisocyanate (B); and
(iii) a low molecular weight bifunctional chain extender (C) having a molecular weight in a range lower than about 500.

Most preferred is the reaction product of:
(i) a poly(alkylene ether)glycol (A) having a number average molecular weight of from about 600 to about 3500;
(ii) a diisocyanate (B); and
(iii) a low molecular weight bifunctional chain extender (C) having a molecular weight in a range lower than about 500.

The prepolymer is useful as a sealant, an adhesive and as a coating on various substrates, as well as in the form of various shaped articles such as films, tubes and rods. Compositions including this prepolymer are useful in electrical cable insulation.

The prepolymer is melt-processible at low temperatures.

When cured, the prepolymer polymerizes to an elastomer having excellent physical properties such as tensile strength, elongation, abrasion resistance and tear strength.

In film form, and wherein the polyol is poly(oxyethylene)glycol, superior moisture vapor transmission rates are achieved and when elastomeric films are formed as composites with various textiles or other substrates, which composites are especially useful in rain protective garments.

BRIEF DESCRIPTION OF THE DRAWINGS

FIG. 1 is a triangular coordinate plot illustrating the percentage equivalents of isocyanate, polyol and chain extender generally utilized in polyurethane elastomer technology.

FIG. 2 is a schematic diagram of a process and apparatus used in coating a textile fabric with the elastomer of this invention.

DETAILED DESCRIPTION OF THE INVENTION AND PREFERRED EMBODIMENTS WITH REFERENCE TO THE DRAWINGS

In accordance with the present invention, phase-separating, polyurethane pepolymers herein are the reactive, 100 percent solids, phase-separating, segmented, polyurethane prepolymers being the reaction products of:
(i) a polyol (A) having a number average molecular weight of from about 600 to about 3500 and having a functionality of at least 2;
(ii) an isocyanate (B) having a functionality of at least 2; and
(iii) a low molecular weight chain extender (C) having a molecular weight in a range lower than about 500, and having a functionality of at least 2,
characterized in that the above reactants are employed in such proportions as to satisfy the following equations:

$$\frac{Eq_{NCO}}{Eq_{OH} + Eq_{CE}} \geq 1.1 \quad (a)$$

$$Eq_{OH} \geq Eq_{CE} \quad (b)$$

$$Eq_{CE} > 0, \quad (c)$$

wherein $Eq_{NCO}$ is the equivalents of the isocyanate species employed, and $Eq_{OH}$ and $Eq_{CE}$ denote the equivalents, respectively, of the polyol and chain extender. This invention provides the aforesaid novel prepolymers, the processing made possible by the prepolymers, the polyurethane elastomers resulting from the prepolymers and the products made from these prepolymers.

Preferred in the reaction product of:
(i) a polyol (A) having a number average molecular weight of from about 600 to about 3500;
(ii) a diisocyanate (B); and (iii) a low molecular weight bifunctional chain extender (C) having a molecular weight in a range lower than about 500.

Most preferred is the reaction product of:
(i) a poly(alkylene ether)glycol (A) having a number average molecular weight of from about 600 to about 3500;
(ii) a diisocyanate (B); and
(iii) a low molecular weight bifunctional chain extender (C) having a molecular weight in a range lower than about 500.

For convenience and clarity in teaching the present invention, the following description is limited to difunctional compounds and to a macroglycol being of a poly(alkylene ether)glycol. This should be recognized as not to be limiting the scope or spirit of the invention. As will be apparent to those in the art, functionalities greater than two may be used to tailor desired properties, such as compression set, depending upon the application. Likewise, the polymeric backbone can be expected to be other than poly(alkylene ether) as desired or required by the application.

It is well accepted in the art that the excellent physical properties of polyurethane elastomeric polymers is due to the two-phase microstructure which exists when the hard and soft segments in the system phase-separate. This invention provides for a novel, one component system for introducing effective hard and soft segments into a polyurethane polymer.

This invention provides for prepolymers having suitable hard and soft segments. These polyurethane prepolymers have an excess of the reactive isocyanate functional group depicted graphically as falling within Region D of FIG. 1 and expressed mathematically by the equation (a) set forth above.

The prepolymers herein are the reaction products as stated above. However, for the purpose of further clarification, it is believed that they may be represented by the following formula (I):

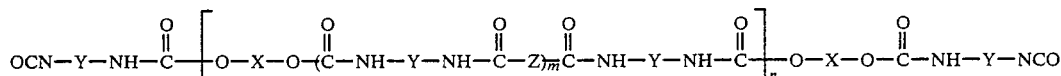

wherein:
X is a residue derived by the elimination of the two hydroxyl groups from a poly(alkylene ether)glycol (A) having a molecular weight in a range of about 600 to about 3500;
Y is a residue derived by the elimination of the two isocyanate groups from an organic diisocyanate (B); and
Z is a residue derived by the elimination of two active hydrogens from a low molecular weight bifunctional chain extender (C) having a molecular weight in a range lower than about 500; and m and n are each positive real numbers.

The formula (I) may be more generally represented by the following schematic (II):

wherein:

is the residue of having reacted an organic diisocyanate with the adjacent organic species, as familiar to those skilled in the art, and if no adjacent species is present, as in pendant

at the end of a chain above, then the unreacted isocyanate functional group is assumed present, ~ is the residue derived by the elimination of the two hydroxyl groups from a poly(alkylene ether)glycol (A) having a molecular weight in a range of about 600 to about 3500;

◇ is the residue derived by the elimination of two active hydrogens from a low molecular weight bifunctional chain extender (C) having a molecular weight in a range lower than about 500; and m and n are again each positive real numbers.

By way of example, to clarify the schematic being utilized, a poly(oxyethylene)glycol (A) of molecular weight 1450 is reacted with 4,4'-diphenylmethane diisocyanate (B) and 1,4-butane diol (C) according to the teaching described later at an equivalency ratio of 4:2:1, isocyanate (B):macroglycol (A):chain extender (C), then from above m=1 and n=1 and from formula (I):

$$X = -CH_2CH_2-(O-CH_2CH_2)-_p$$

such that p yields a molecular weight of about 1450,

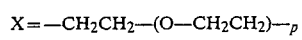

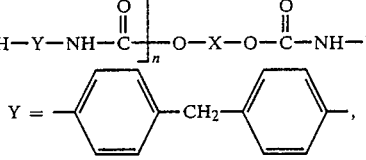

and $$Z = -O-CH_2CH_2CH_2CH_2-O-$$

or schematically (III):

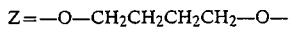

Or, further, if the same species were reacted according to the teachings herein at an equivalency ratio of 5:2:2, isocyanate (B):macroglycol (A):chain extender (C), then m=2 and n=1 and schematically (IV):

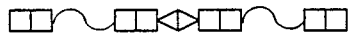

Or, further, if the same species were reacted according to the teachings herein at an equivalency ratio of 6:3:2 then m=1 and n=2 and schematically (V):

It is generally recognized by those practiced in the art that the soft segment is that provided by the macroglycol, herein the poly(alkylene ether)glycol (A), and the hard segment is provided by the reaction product of the organic diisocyanate (B) and the low molecular weight bifunctional chain extender (C). According to formula (I) this is represented by:

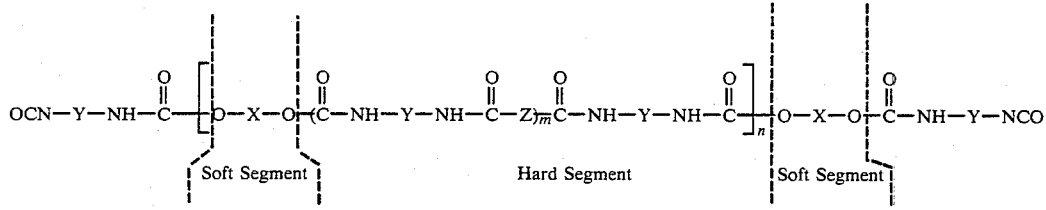

According to the schematic representation set forth herein it would be recognized that the symbol:

∼ would represent the soft segment as described, and a collection of symbols such as,

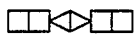

would represent the hard segment as described, so that a prepolymer made as the reaction product of an equivalency ratio of 5:2:2 organic diisocyanate (B); poly(alkylene ether)glycol (A); chain extender (C) would be understood as follows, schematic (VI):

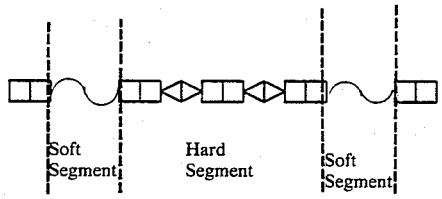

It should be recognized, as will be apparent to those skilled in the art, that the isocyanate functional group is highly reactive and dependent on such things as reaction conditions, the species employed, unexpected contaminants and so forth, which will all affect the resulting reaction product. As such, formula (I) and schematic (II) represented above illustrate the best understood first approximation of the prepolymers of this invention, most accurately described as the reaction products of:
(i) a poly(alkylene ether)glycol having a number average molecular weight of from about 600 to about 3500;
(ii) a diisocyanate (B); and
(iii) a low molecular weight bifunctional chain extender (C) having a molecular weight in a range lower than about 500, characterized in that the above reactants are employed in such proportions as to satisfy the following equations:

$$\frac{Eq_{NCO}}{Eq_{OH} + Eq_{CE}} \geq 1.1 \qquad (a)$$

$$Eq_{OH} \geq Eq_{CE} \qquad (b)$$

$$Eq_{CE} > 0, \qquad (c)$$

wherein $Eq_{NCO}$ is the equivalent of the isocyanate species employed and $Eq_{OH}$ and $Eq_{CE}$ denote the equivalents, respectively, of the macroglycol and chain extender.

The prepolymers of this invention can be prepared by procedures conventional in the art for the synthesis of polyurethane elastomers. Such procedures include the prepolymer procedure in which the isocyanate is reacted with the polyol in a first step and the isocyanate terminated prepolymer so produced is subsequently reacted with a stoichiometric deficiency of chain extender to result in a prepolymer having equivalency falling within Region D of FIG. 1 and mathematically satisfying equations (a), (b) and (c), above. The one-shot procedure in which all the reactants are brought together simultaneously is also suitable in the synthesis of the prepolymers of this invention. The prepolymer route is the preferred procedure for preparing the reactive, phase-separating polyether polyurethane prepolymers of this invention. In a most preferred embodiment, to be described in detail below, the prepolymer of this invention is prepared by a slow addition of polyol to liquid diisocyanate in such a manner as to favor a narrow molecular weight distribution of isocyanate terminated prepolymer, followed by the addition of the deficiency of chain extender.

Whichever method of preparation is employed, it is found, surprisingly, that the reactive prepolymers of this invention have excellent storage stability without the need for stabilization typically employed with other polyurethane prepolymers, such as that provided by acyl halides, such as p-nitro benzoyl chloride. Despite being stored at room temperature as a 100 percent solids system and having a concentration of urethane and/or urea groups in the presence of the reactive isocyanate species, shelf stability is exhibited by the percent free isocyanate remaining consistently at close to the theoretical percent isocyanate calculated and the ability to continue to be able to process these systems over an extended period of time without seeing gel formation. Further, and equally surprisingly, it has been found that closely related polyurethane prepolymers, prepared in identical fashion and from the same reactants as set forth above, but using proportions of reactants which do not meet the requirements of equation (b), supra, show markedly inferior shelf stability and a difficulty in achieving the theoretical percent isocyanate during the synthesis thereof.

It is believed that this remarkable difference in shelf stability between the prepolymers of this invention on the one hand, and, on the other hand, the related prepolymers which differ only in that the proportions of reactants used therein do not meet the requirements of equation (b) above, is attributable to the location of the hard segment(s) in the prepolymer chain. By the synthesis procedures employed herein the prepolymers satisfying all the equations (a), (b) and (c), supra and thus falling within Region D1 of FIG. 1, are believed to exhibit the hard segment(s) internal to the prepolymer chain sandwiched between the soft segments. Conversely, by the synthesis procedures employed herein, the prepolymers satisfying equations (a) and (c) but not (b), supra, and thus falling within Region D2 of FIG. 1, are believed to exhibit hard segments pendant on the prepolymer chain sandwiching soft segment(s) between them.

By way of illustration, a shelf stable prepolymer of this invention would be provided by the reaction product of an organic diisocyanate (B) with a poly(alkylene ether)glycol (A) and low molecular weight bifunctional chain extender (C) at an equivalency ratio of 4:2:1 respectively, which satisfies the above cited equations. This prepolymer would be schematically (VII) illustrated as:

A prepolymer made in the same manner and with the same reagents as above, but not satisfying equation (b), would be provided at an equivalency ratio of 4:1:2. This prepolymer would be expected to provide for poor shelf stability and would be schematically (VIII) illustrated as:

It is believed that the requirement that the prepolymers of this invention mathematically satisfy equation (b) set forth above is equivalent to the structural requirement of internal hard segments.

Additionally, it has been found that not all internal hard segments provide for shelf stability of prepolymers even when equations (a), (b) and (c) have been satisfied. It appears that not only must the hard segment be located internal to the prepolymer chain but the hard segment must be a "suitable" hard segment. A suitable hard segment is one that induces phase-separation of the hard and soft segments found in the prepolymer chain. It is believed that such phase-separation results in domains of hard segments dispersed in the soft segments. This two-phase morphology may be schematically (IX) illustrated with a 4:2:1 prepolymer system as:

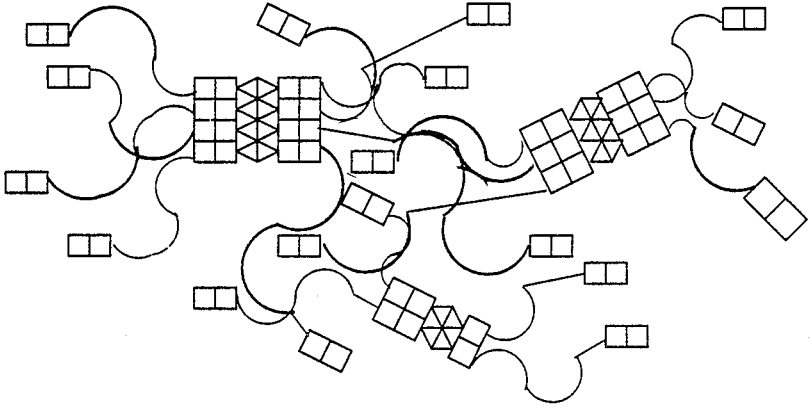

This two-phase morphology is believed to be the source for the prepolymer stability of this invention. It appears to effectively reduce the prepolymer chain mobility and diminishes the effective concentration of the active hydrogen species available for reaction with isocyanate through the hard segment domain reducing those active hydrogen species available to the interface between the two domains.

A suitable hard segment is one that effects phase-separation of the hard and soft segments of the prepolymer of this invention. Factors influencing phase-separation in $(AB)_n$ type thermoplastic polyurethanes have been extensively studied and these teachings can be employed for the purpose of achieving suitable hard segments for the prepolymers of this invention. See for example the review in, *Multiphase Polymers,* Gould, Robert ed., Chapter 1, "Morphology and Properties of Segmented Copolymers", 1979, pps 3–30. In general, the factors yielding a two-phase structure are those resulting in thermodynamic incompatibility between the hard and soft segments, which depends on the segment type, segment length, segment compatibility, chemical composition, method of fabrication and the ability of the segments to crystallize.

Because there are numerous factors influencing the tendency of hard segments to phase-separate into domains dispersed within the soft segments, it will be apparent to one skilled in the art that there will not be a precise dividing line between "suitable" hard segments and those not "suitable" within the scope of this invention. Each condition and situation must ultimately be evaluated independently.

As set forth above, the hard segment of the segmented prepolymer is the residue derived by the reaction of the organic diisocyanate (B) and the low molecular weight bifunctional chain extender (C). For a suitable hard segment, this reaction product must produce a hard segment that is thermodynamically incompatible with the soft segment or polyol utilized. In general, the organic diisocyanates and low molecular weight bifunctional chain extenders known in the art may be employed in the invention herein, so long as the condition of thermodynamic incompatibility is satisfied.

It has been found that the preferred organic diisocyanates (B) to be used for the prepolymer in accordance with this invention are those exhibiting several or all of the following characteristics: bulk, symmetry around the isocyanate functional groups, rigid, aromatic, crystalline and high purity. By way of example, but not limited to, are: 4,4'-diphenylmethane diisocyanate, cyclohexanediisocyanate, p-phenylene diisocyanate, 1,5-napthalene diisocyanate, toluene diisocyanate, p-xylene diisocyanate, hexamethylene diisocyanate, 4,4'-dicyclohexylmethane diisocyanate, 4-bis(isocyanamethyl)- cyclohexane, p-tetramethylxylene diisocyanate, m-tetramethylxylene diisocyanate or the like. The organic diisocyanates (B) may be employed singularly or in admixture with each other.

The low molecular weight bifunctional chain extender (C) to be used for the prepolymer in accordance with this invention has a molecular weight in the range from about 40 to about 500 and exnhibits several or all of the following characteristics: symmetry, rigid, free from branching, low molecular weight, aromatic, crystalline, high purity. It has been found, surprisingly, that a broader range of chain extenders than expected may be utilized in accordance with this invention and still yield a prepolymer with the characteristics as set forth herein. Suitable chain extenders may come from the following classes of compounds:

(i) glycols of aromatic, open chain aliphatic, cycloaliphatic and combinations thereof,
(ii) aromatic diamines,
(iii) alkanolamines and hydroxy acylamines, and
(iv) it is further contemplaed that open chain aliphatic and cycloaliphatic diamines are satisfactory given an appropriate synthesis procedure.

By way of example, but not limited to, are: 1,4-butane glycol, 1,6-hexane glycol, hydroquinone di(-hydroxyethyl)ether, bis(hydroxyethyl)bisphenol A, bis(2-hydroxypropyl)bisphenol A, bis(2-hydroxypropyl)isophthalate, bis(2-hydroxyethyl)carbamate, 1,2-bis(2-aminophenylthio)ethane, trimethylene glycol di-p-aminobenzoate, resorcinol di(-hydroxyethyl)ether, 1,4-cyclohexane dimethanol, 4,4'-dihydroxy diphenyl sulfone, 4,4'-methylene bis(o-chloroaniline), phenylene diamine, methylene bis(aniline), ethanolamine, N,N'-(bis-2-hydroxyethyl)dimethylhydantoin, ethylene diamine, butane diamine, and the like. The low molecular weight bifunctional chain extenders (C) may be used singly or in admixture with each other.

The poly(alkylene ether)glycol (A) employed for the prepolymer in accordance with the present invention has a molecular weight in the range from about 600 to about 3500. The term "poly(alkylene ether)glycol" as used herein represents a macroglycol of a poly(alkylene ether) backbone with two terminal hydroxy groups. More generally, the term denotes a difunctional polyether terminated with hydroxy groups. These compounds are ordinarily derived from the polymerization of cyclic ethers such as alkylene oxides or dioxolane or from the condensation of glycols. They are sometimes known as poly(alkylene)glycols, poly(alkylene oxide)glycols, polyglycols, polyoxyalkylenes, n-polyoxyalkylene diols. They may be represented by the formula (X):

HO—(RO)—$_r$H wherein R denotes an alkylene radical and r is an integer greater than 1.

In the polyethers useful in this invention, r is sufficiently large that the poly(alkylene ether)glycol has a molecular weight of about 600 or greater. Not all the alkylene radicals represented by R need be the same. Macroglycols formed by the copolymerization, random or block, of a mixture of different alkylene oxides or glycols may be used, or the polyglycol may be derived from a cyclic ether such as dioxolane, which results in a product having the formula HO(CH$_2$OCH$_2$CH$_2$O)$_r$H. The alkylene radicals may be straight chain or may have a branched chain as in poly(propylene ether)glycol. Typical representations of this class of compound are polytetramethylene glycol, poly(propylene ether)glycol, poly(oxyethylene)glycol and the copolymers resulting from the block or random copolymerization of ethylene oxide and propylene oxide and those resulting from the copolymerization of tetrahydrofuran and ethylene oxide. The poly(alkylene ether)glycols (A) may be used singly or in admixture with each other.

It is further contemplated that prepolymers made in accordance with this invention may be prepared from other macroglycols familiar to those skilled in the art providing advantages herein delineated. Such polyols might include polyesters such as those prepared from the reaction of dibasic acids with diols or from the addition polymerization of ϵ-caprolactone. Additonally suitable polyols might include hydroxyl terminated, polyester-amides, polycarbonates, polybutadiene or copolymers thereof.

Although the most preferred prepolymers of this invention are prepared from difunctional compounds, to achieve certain physical properties, as will be apparent to those skilled in the art, the prepolymers may be further tailored by incorporating species of higher functionalities in various amounts. The higher functionality, and thus higher branching in the prepolymer, may be introduced to the system through the polyol, isocyanate or chain extender.

The prepolymers of this invention, even at low molecular weights, are generally solid at room temperature, whereas prior prepolymers bearing no hard segment or non-soluble hard segments are not generally found to be solid until much higher molecular weights. This solid nature may be attributed to the higher ordering and increased molecular interaction of the prepolymer system that occurs when the hard segments aggregate in domains. It has been determined, generally, that those systems that yield suitable hard segments as defined herein phase-separate at room temperature to a sufficient degree that the overall appearance of the prepolymer is usually a highly opaque, white solid. It is believed that this opacity, in those systems devoid of any crystallinity in the soft segment, is due to the difference in the refractive indices of the hard and soft segment domains. It has been found that this opacity, introduced by the two-phase morphology of the prepolymers of this invention, may be used to qualitatively determine the degree of phase-separation that is occurring and, thus, in turn, may be used as a tool of first approximation to evaluate the suitability of the hard segments formed.

It is found, surprisingly, that the phase-separating polyurethane prepolymers of this invention provide unique melt flow properties compared to their thermoplastic polyurethane counterparts having hard segments. It has been found that these phase-separating prepolymers are low melting and, as such, may be melt-processed at lower temperatures than typical thermoplastic polyurethane technology provides. In addition, these prepolymers generally show a sharp decrease in melt viscosity soon after the melting of the hard segment domains. Once sufficient energy is provided to the phase-separating prepolymer system to remove the intermolecular interaction provided by the hard segment domain and allow for phase-mixing, the low molecular weight of the prepolymer affords for significantly lower chain interaction, and therefore, lower viscosity.

A significant feature provided by the low melting characteristic of the prepolymers herein is the ability to utilize hard segments containing urea functionality. It is known that hard segments resulting from diamine chain extenders generally provide improved physical characteristics over their glycol counterparts. However, the increased hydrogen bonding encountered in such urea containing hard segments frequently requires heating the system to the point of degradation thus necessitating use limited to solution systems.

As discussed above, low melting thermoplastic polyurethanes, per se, are known. However, known low melting thermoplastic polyurethanes do not possess generally good physical property profiles. Known low melting thermoplastic polyurethanes have been prepared, for example, by employing a reaction mixture containing the difunctional reactants and large amounts of monofunctional copmpounds having an active hydrogen such as alcohols or amines. Such a reaction mixture results in the production of relatively short-chained polyurethanes which, understandably, exhibit a poor property profile. Additionally, low melting thermoplastic polyurethanes have been prepared by the incorporation of glycols which produce hard segments having a low melt temperature, but a concomitant poor physical property profile. U.S. Pat. No. 4,273,911, discloses low melting polyurethanes having improved physical characteristics via a balance of melting point lowering and strength enhancing diols in the hard segment.

In polyurethane elastomers, it is commonly recognized that for good physical characteristics in use, it is preferred to have a soft segment having a glass transition temperature ($T_g$) well below the expected use temperature and a hard segment having a melt temperature ($T_m$) well above the expected use temperature. The latter temperature has been understood to control the melt temperature of the overall thermoplastic polyurethane. A surprising feature of the prepolymers of this invention is the magnitude to which this melt temperature of the hard segment is suppressed, allowing for low melt characteristics. Further, it has been determined that the prepolymers of this invention have melt flow characteristics in many cases well below that indicated by what would be considered the hard segment melt temperature ($T_m$). More specifically, Thermal Mechanical Analysis and Melt Flow Index indicate a softening point and melt flow below the endotherm associated with $T_m$ determined by Differential Scanning Calorimetry. Equally surprising is the finding that, after allowing the prepolymer to cure, even with water, the hard segment melt temperature ($T_m$) has increased to appreciably higher temperatures, yielding cured polyurethane elastomers having exceptional physical properties and in some cases being capable of melt processing, although at significantly higher temperatures as typical of other thermoplastic polyurethanes in the art. It is possible that this characteristic of the phase-separating, segmented prepolymers of this invention is due to both the low molecular weight and phase mixing and/or lower ordering in the prepolymer with enhanced phase-separating and/or higher ordering along with higher molecular weight once the prepolymer is cured.

As mentioned, supra, thermal analysis, namely differential scanning calorimetry (DSC), thermal mechanical analysis (TMA), melt flow index (MFI), thermal gravimetric analysis (TGA) and gradient hot plate (GHP), was utilized to detect and investigate the contribution of the separate phase domains and thermal characteristics discussed. There has been much published in the literature for analyzing segmented polyurethanes via these thermal techniques. See, by way of example, the review and its references in *Multiphase Polymers*, Gould, Robert ed., Chapter 4, "Thermoplastic Polyurethane Elastomer Structure—Thermal Response Relations", 1979, pps 83–96.

The segmented polyurethane elastomers produced from the prepolymers of this invention exhibit excellent physical properties typical of $(AB)_n$ segmented polyurethane copolymers, as measured by ultimate tensile strength, elongation, modulus of elasticity and tear strength. The prepolymers of this invention may be cured by procedures conventional in the art for the curing of isocyanate terminated prepolyemrs. By way of example, but not limited to, moisture, blocked amines, oxazolidines, epoxies, triisocyanurate ring formation, allophonate and biuret crosslinking and the like. Dependent upon the curing technology employed, the resulting polyurethane elastomers may be either a thermoset polyurethane, or a higher melt temperature thermoplastic polyurethane once curing is accomplished.

As will be apparent to one skilled in the art, the final physical properties of the elastomers of this invention may be altered considerably by altering the identity, stoichiometry and molecular weight of the species reacted. As such, the determination of a precise boundary between cured prepolymers made so as to satisfy equations (a), (b) and (c), supra, exhibiting elastomeric or plastic properties, is practically impossible. The amount of the reactants employed in the prepolymer depends, inter alia, on the desired properties of both the prepolymer and the final cured polyurethane.

A unique benefit is provided by the prepolymers of this invention. That is, they may be used directly as a one component, 100 percent solids system, and allowed to cure yielding exceptional final physical properties. In addition, the prepolymers herein may be used in combination with other resins and/or curing techniques to provide further unique results.

By way of example, but not limited to, techniques such as polymer alloying through polyblends or interpenetrating polymeric networks (IPN) may be employed. Since the prepolymers of this invention are so versatile, they may be tailored to yield different melt processing temperatures by considering such factors as cited above, thus a prepolymer may be "tailored" to suit the processing requirements of the other resin, and as such be more easily incorporated. By way of example, the prepolymer herein have been successfully incorporated into a heavily filled ethylene acrylic resin at less than 5 percent by weight with a surprising doubling of the tear strength previously possible. It is further contemplated, that the prepolymers of this invention would prove useful as polymer blends, alloys, and interpenetrating polymeric networks with, but not limited to, polyacrylates, polymethacrylates, polyamides, polyamines, polysulfides, polyethers, polyesters, polycarbonates, polychloroprene, poly(vinyl chloride), polysiloxanes, vinyl polymers, and the like.

A unique and worthwhile result provided by the phase-separating, segmented, polyether polyurethane prepolymers of this invention is the good intermediate physical property profile of the polyether prepolymers prior to curing. The polyether prepolymers conventionally available in the prior art do not generally obtain good physical property characteristics until substantially into their cures. As a result of the segmented, phase-separating nature of the polyether prepolymers of this invention, a rapid increase in apparent crosslinking occurs when the prepolymer is allowed to cool during processing. This results in high intermolecular interaction yielding a high effective viscosity or what is commonly referred to as "green strength". Thus, these prepolymers develop some of their good physical properties prior to curing through the isocyanate functional group.

Further, and surprisingly, the prepolymers of this invention exhibit the desirable tendency to be low foaming when cured with water, particularly as compared to the prepolymers more conventional in the art. This is particularly true in cases in which there is a higher tendency for the segments employed to phase-separate. This yields improved physical properties at larger cross sectional thicknesses than would be possible without the reduced foaming.

An additional unexpected result was found in the prepolymers of this invention prepared from a poly(alkylene ether)glycol (A) of polyoxyethelene. In the segmented, phase-separating, polyoxyethylene prepolymers containing suitable hard segments, it was found that once cured, films thereof showed, simultaneously, an increase in moisture vapor transmission rate and physical property profile. Historically, it has been difficult to obtain the required physical characteristics, i.e. ultimate tensile strength, ultimate elongation, modulus of elasticity, tear strength and abrasion characteristics, in a highly hydrophilic polymer to allow it to be useful commercially. Specifically, films of highly hydrophilic polymers have tended to be weak and either easily torn or damaged by abrasion and/or flex, especially when swollen with water.

Historically, there was a need to find the most suitable compromise between moisture vapor transmission and physical properties. The prepolymer route defined herein provides an elastomer having a high moisture vapor transmission rate without a concomitant deterioration in physical properties, but, rather, an increase thereof. This increase in moisture vapor transmission rate and physical properties is believed to be the result of the heterophase structure resultant in the polyurethanes of these prepolymers. As a result, the polyoxyethylene soft segment is "reinforced" by the hard segment domains and a water molecule is provided a shorter effective diffusive path length in the hydrophilic soft domain than what would be experienced in a homophase containing a similar weight percent of the hydrophilic polyoxyethylene.

Furthermore, the prepolymer route provided herein allows for desirable physical properties and melt processing outside of the limitation of equal balance on a weight basis, between the total soft segments present in the molecule with the total hard segments present therein, disclosed in U.S. Pat. No. 3,901,852. In addition, this invention allows for the polyoxyethylene content to be greater than the maximum 45 percent by weight of the reaction mixture as disclosed in U.S. Pat. No. 4,367,327, and still have excellent physical properties.

The physical properties, characteristics and scope of the reactive, segmented, phase-separating, polyether polyurethane prepolymers of this invention render them well suited for use, among other things, as adhesives, coatings and sealants.

As set forth above, the prepolymers of this invention are preferably made by a prepolymer procedure and most prefereably by the batch prepolymer procedure as herein described. The mixing of the reactants can be accomplished by any of the procedures and apparatus conventional in the art. Preferably the individual components are received as urethane grade and, as such, have low moisture content or are rendered substantially free from the presence of water using conventional procedures, for example, by azeotropic distillation, or by heating under reduced pressure at a temperature in excess of the boiling point of water at the pressure employed. The later procedure is preferred to accomplish degassing of the components.

The proportions of the reactants as described herein are consistent with the equivalency ranges defined above.

The diisocyanate (B) is charged to the reaction vessel first at ambient temperature, preferably under conditions that minimize the isocyanates' exposure to ambient moisture. The reaction vessel is evacuated of ambient moisture and blanketed with nitrogen. The diisocyanate in an inert atmosphere of nitrogen is then brought up to a temperature generally from 40° C. to 100° C., preferably at a minimum temperature just above the melting point of the diisocyanate employed. To the diisocyanate is added the poly(alkylene ether)glycol (A) as a liquid, frequently heated to the same temperature as the diisocyanate. The glycol is added dropwise to the diisocyanate at a rate that allows the glycol to be substantially capped by the diisocyanate at any point in time. That is to say, the actual percent free isocyanate, as measured by a dibutylamine titration or equivalent procedure, approximates the theoretical percent of free isocyanate expected by the known amount of glycol addition to that point. Subsequent to the addition of the glycol the isocyanate terminated prepolymer thus formed is heated preferably to the minimum temperature empirically found wherein the prepolymer product of this invention, once formed, can still be stirred in the vessel being employed. Dependent upon the hard segment being formed, the desired molecular weight and the reaction vessel/stirrer employed, inter alia, this minimum temperature is from about 60° C. to about 150° C. The bifunctional chain extender (C), usually at ambient temperature is charged to the intermediate prepolymer as soon as it is at temperature, or before, wherein the resulting exotherm can be used to assist the reaction mass to reach the desired final temperature. The addition can be at a point wherein the reactivity of the chain extender is sufficiently slow to not cause an increase in viscosity above that which the system can handle as the temperature is increasing. Preferably, the chain extender is charged all at once unless the exotherm results in a temperature increase above that which is desired.

Shortly before and/or after the chain extender has been added, the reaction mass is degassed via vacuum. Typically, degassing may proceed as soon as opacity of the prepolymer begins to appear or, similarly, as the viscosity is seen to increase significantly. The reaction mass is held at temperature until the free isocyanate content decreases to approximately 0 to 20 percent above the theoretical final percent free isocyanate value calculated, and then the prepolymer is discharged into suitable containers and sealed under nitrogen to exclude any ambient moisture.

Alternatively, in the preferred batch prepolymer process, the poly(alkylene ether)glycol (A) may be added to the diisocyanate (B) at a rate in excess of that described above in the most preferred procedure, and at a rate so as not to cause an undesired increase in temperature due to the exotherm.

When the prepolymers of this invention are prepared by the less preferred one-shot method, the reactants are brought together at essentially the same time, in any order. Advantageously, the poly(alkylene ether)glycol (A) and the bifunctional chain extender (C), are preblended and fed to the reaction vessel as a single component, the other component being the diisocyanate (B). This reaction is carried out advantageously within the range of the final reaction temperature specified above for the prepolymer procedure. In general, the prepolymer may be degassed as described previously, at the point of opacity or increased viscosity. The degassed prepolymer is transferred to a suitable container, once about from 0 to 20 percent of the theoretical end point is obtained.

It is advantageous to minimize the temperature and time at temperature of the reaction mass to avoid undesirable side reactions which may occur, such as the formation of allophonate, biuret and triisocyanurate groups. Such side reactions will cause branching, crosslinking and result in an undesirable elevation of the melting point of the product as well as destroy the order of the segmented system.

It may be desirable, but not essential, to include a catalyst in the reaction mixture employed to prepare the prepolymers of this invention. Any of the catalysts conventionally employed in the art to catalyze the reaction of an isocyanate with a compound containing an active hydrogen can be employed for this purpose. The amount of catalyst employed is generally within the range of about 0.02 to about 2.0 percent by weight of the reactants.

If desired, the prepolymers of this invention can have incorporated in them, at any appropriate stage of preparation, additives such as pigments, fillers, lubricants, stabilizers, antioxidants, coloring agents, fire retardants and the like, which are commonly used in conjunction with polyurethane elastomers. The same care must be taken to ensure low moisture levels of the additives as appropriate in conventional polyurethane prepolymer technology.

As an alternative to the batch process described above, it is contemplated that equally acceptable prepolymers of this invention may be produced continuously, for example, by employing a reaction extruder. Further, it is contemplated that the preferred method, allowing for the high reactivities of the amine functional group in the preparation of the prepolymers herein, would be the use of an impingement style mixer as typically found in RIM mixer heads.

An elastomer-coated fabric can be made with the prepolymer of this invention as shown in FIG. 2. Therein, a continuous belt 2 of FEP fluorocarbon polymer passes over heated roller 4 and the liquid prepolymer 6 of this invention is applied to the belt 2 by a doctor blade 8 to form film 10 thereon. The belt and film are carried over cold roller 12 in the direction of rotation shown by the arrows, and fabric 14 is applied to film 10 in the nip of rollers 12 and 16 as shown. The film has some green strength at this point and is somewhaat tacky. The composite textile carrying the film, 18, is stripped from the FEP belt by the peel bar 20 and then the composite proceeds to a conventional cure step, not shown, represented by the arrow shown, thereby producing a fabric coated with the elastomer of this invention.

A description of the test employed to measure moisture vapor transmission rate (MVTR) is given below. The procedure has been found to be suitable for testing thin (generally less than 10 mils) hydrophilic films and composites thereof.

In the procedure, approximately 70 mls of a saturated salt solution of potassium acetate and distilled water is placed into a 4.5 ounce polypropylene cup, having an inside diameter of 6.5 cm at the mouth. An expanded PTFE membrane (EPTFE), having a Gurley number of 5.5 seconds, a bubble point of 26.8 psi, thickness of 25 micrometers and a weight of 12 gms per square meter, available from W. L. Gore & Associates, Incorporated, Elkton, Md., product designation PN 10300NA, is heat sealed to the lip of the cup to create a taut, leakproof, microporous barrier containing the salt solution. A similar EPTFE membrane is mounted taut within a 5 inch embroidery hoop and floated upon the surface of a water bath. The water bath assembly is controlled at 23° C. plus or minus 0.1° C., utilizing a temperature controlled room and a water circulating bath.

The sample for testing MVTR is mounted taut in a 3 inch diameter embroidery hoop and equilibrated in a chamber having a relative humidity of about 86 percent for 48 hours. The film is then adjusted to be taut in the hoop and is placed face down onto the surface of the floating EPTFE membrane.

The cup assembly is weighed to the nearest 1/1000 gm and is placed in an inverted manner onto the center of the test sample.

Water transport is provided by the driving force between the water and the saturated salt solution providing water flux by diffusion in that direction. The sample is tested for 15 minutes and the cup assembly is then removed, weighed again to within 1/1000 gm.

The MVTR of the sample is calculated from the weight gain of the cup assembly and is expressed in grams of water per square meter of sample surface area per 24 hours.

A second cup assembly is simultaneously weighed to within 1/1000 gm and placed onto the test sample in an inverted manner as before. The test is repeated until a stead state MVTR is observed by two repetitive MVTR values. With thin films, this generally requires only two successive tests.

Several thicknesses of film are tested and the values thereof extrapolated to a normalized film thickness of 2 mils for the purposes of direct comparison when appropriate.

The abrasion data presented in the examples was conducted as specified in Federal Standard 191, Method 5304 except that the abradant was a 70-by-50 mesh stainless steel screen. Failure to abrasion was determined by leakage to water under a hydrostatic head test of 30 inches for 3 minutes in accordance with Federal Standard 191, Method 5516. Abrasion results are then reported as number of cycles abrated without failure to leakage.

EXAMPLE 1

A prepolymer of this invention was prepared from 196.2 gm (1.570 molar equivalents) of 4,4'-diphenylmethane diisocyanate (B), 386.2 gm (0.7847 molar equivalents) of poly(oxytetramethylene)glycol (A) having a molecular weight of 1000 and 17.64 gm (0.3920 molar equivalents) of 1,4-butanediol (C) having the following most preferred procedure:

The 4,4'-diphenylmethane diisocyanate was added to a 1000 ml jacketed resin kettle at room temperature and the entire flask evacuated with vacuum and purged with dry nitrogen. The 4,4'-diphenylmethane diisocyanate was then heated to 80° C., melting the diisocyanate. To the diisocyanate was added, with stirring, from an addition funnel at room temperature the poly(oxytetramethylene)glycol. The poly(oxytetramethylene)glycol had been previously degassed by heating at 95° C. under reduced pressure for 2 hours. The poly(oxytetramethylene)glycol was added over 1.5 hours. After an additional 20 minutes the free isocyanate value was found to be 5.6 percent, as determined by a standard dibutylamine titration procedure.

To the isocyanate capped poly(oxytetramethylene)glycol thus formed was added the 1,4-butanediol in one charge with rapid stirring and nitrogen purge throughout. After 30 minutes, the free isocyanate value was found to be 2.7 percent, and the prepolymer turned from colorless to be an opaque white.

The segmented prepolymer (Prepolymer I) so formed was poured warm from the reactor directly into paint cans, blanketed with nitrogen and sealed. Prepolymer I may be schematically illustrated as:

Prepolymer I so formed and packaged was found to be storage stable after 4 months as exhibited by a stable isocyanate value of 2.6 percent isocyanate throughout, and the ability to process the prepolymer as desired. Further characteristics of this prepolymer shown in Table 1 additionally exemplify this invention.

The properties of a moisture cured film are also provided therein. The cured film was prepared by heating a container of Prepolymer I at 110° C. for 30 minutes, then, using a draw-down bar of a fixed gap of 0.13 mm and casting a film of Prepolymer I directly onto a release sheet similar to the process shown in FIG. 2. The film was then cured by placing it in a 90–100 percent relative humidity chamber at ambient temperature.

TABLE 1

| PROPERTIES OF PREPOLYMER I | |
|---|---|
| Softening Point (per Perkin-Elmer TMA probe #0209, 2 gms load) | 62° C. |
| Melting Index: | |
| 2.16 kg at 65° C. | 2.31 gms/10 minutes |
| 2.16 kg at 70° C. | 80.6 gms/10 minutes |
| PHYSICAL PROPERTIES OF A CURED FILM OF PREPOLYMER I | |
| Thickness | 0.086 mm |
| Tensile strength at break (per ASTM D882-81) | 4600 psi |
| Elongation at break (per ASTM D882-81) | 510 percent |
| Modulus of Elasticity (per ASTM D882-81) | 4400 psi |
| Tear Strength | |
| Initiation (per ASTM D1004-66) | 240 pli |
| Propagation (per ASTM D1938-67) | 0.077 lbs at 0.086 mm |
| Softening Point (TMA) | 205° C. |
| Melting Index: | |
| 7.06 kg at 193° C. | 9.95 gms/10 min. |

EXAMPLE 2

To illustrate the "green strength" characteristic and intermediate physical property profile of the prepolymers of this invention, a prepolymer of the nature more familiar to those skilled in the art was made to compare with Prepolymer I. The conventional prepolymer was prepared from 100.8 grams (0.8064 molar equivalents) of 4,4'-diphenylmethane diisocyanate (B) and 199.2 gms (0.605 molar equivalents) of poly(tetramethylene)glycol (A) having a molecular weight of 650. This provided a final molecular weight of a poly(tetramethylene)glycol weight percent of the conventional prepolymer approximating that of Prepolymer I.

The conventional prepolymer was synthesized in a manner similar to the procedure described in Example 1 prior to the addition of the chain extender. The final isocyanate value was found to be 2.62 percent. The prepolymer prepared in this manner was found to be a clear liquid of high viscosity. The conventional prepolymer is schematically illustrated as:

To show the difference between the green strength of the conventional prepolymer and Prepolymer I, the following peel test procedure was used.

A heated sample of the prepolymers was obtained and then a film of each was made utilizing a draw-down bar having a fixed gap of 0.076 mm and casting a film directly onto a fabric of 1.7 ounce/yard Taffeta. A second layer of the Taffeta was immediately placed onto the cast film with even pressure applied to laminate the layers together in the nip between a metal and rubber rollers. One inch wide strips were then die cut and a peel test performed thereon within 10 minutes of casting the film. The conventional prepolymer required a peel force between 0.2 and 0.25 pounds while Prepolymer I required a peel force of at least twice that of the conventional prepolymer. The failure mode in both cases was cohesive in nature.

EXAMPLE 3

Several prepolymers, illustrative of the hydrophilic systems of this invention, were prepared from varying equivalents of 4,4'-diphenylmethane diisocyanate (B), different molecular weights poly(oxyethylene)glycol (A) and hydroquinone di(β-hydroxyethyl)ether (C) using the following procedure.

The flaked 4,4'-diphenylmethane diisocyanate was charged to the reactor and allowed to melt under a dry purge by heating and stirring to 80° C. The polyoxyethylene at 80° C. was added slowly over approximately 2 hours from a heated addition funnel to the stirred reaction vessel. The polyoxyethylene had been previously degassed at 100° C. under reduced pressure for approximately 2 hours. The theoretical percent isocyanate was reached generally within one hour after the final addition of polyoxyethylene as determined by a standard dibutylamine titration. The isocyanate terminated polyoxyethylene so obtained was degassed under reduced pressure at this stage as the temperature was raised to 100° C. With an increased nitrogen purge and stirring, the hydroquinine di(β-hydroxyethyl)ether was charged to the reaction at 100° C. Immediately following the hydroquinone di(β-hydroxyethyl)ether addition the reaction was raised to 125° C. Beginning at this point the product was degassed under reduced pressure. After the hydroquinone di(β-hydroxyethyl)ether addition, a viscosity increase was observed, and shortly thereafter opacity developed. As the product approached close to the theoretical isocyanate value, usually within one hour after the hydroquinone di(β-hydroxyethyl)ether addition, the warm, thick, opaque white prepolymer was discharged to a paint can blanketed with nitrogen, sealed and allowed to cool. Thereafter, the prepolymers were monitored for isocyanate value and found to be very stable over an extended period of time. The prepolymers prepared herein further exhibited stability by the retention of the retention of their processing characteristics and remained free of gel formation. Additionally, the prepolymers were characterized as shown below. As in Example 1, films were cast and then cured by ambient moisture.

property profile of the hydrophilic prepolymers of this invention various prepolymers were synthesized containing essentially the same weight percent polyoxyethylene while varying the phase-separating hard segment concentration. Specifically, the prepolyers II, IV, V and subsequent film from Example 3.

The data in Table 3 show the simultaneous improvement in physical properties and MVTR with improved phase-separation.

TABLE 3

|  | IV | II | V |
| --- | --- | --- | --- |
| PREPOLYMER |  |  |  |
| 4,4'-diphenylmethane diisocyanate Molar equivalents | 3.434 | 1.774 | 1.540 |
| Polyoxyethylene (1450 molecular weight) |  |  |  |
| Molar equivalents | 1.717 | 0.8870 | 0.7702 |
| Weight percent | 72.18 | 70.49 | 69.41 |
| Hydroquinone di(β-hydroxyethyl)ether Molar equivalents | 0.4300 | 0.4519 | 0.5135 |
| Hard Segments Weight percent | 8.8 | 17.5 | 22.50 |
| PROPERTIES OF CURED FILMS |  |  |  |
| Thickness (mils) | 0.16–0.27 mm | 0.06–0.37 mm | 0.30–0.33 mm |
| Normalized MVTR (gms/m$^2$ · 24 hours · 2 mils) | 14200 | 15300 | 16000 |
| Tensile Strength at Break (per ASTM D882-81) | 1400 psi | 1900 psi | 1900 psi |
| Elongation of Break (per ASTM D882-81) | 680 percent | 520 percent | 960 percent |
| Modulus of Elasticity (per ASTM D882-81) | 1300 psi | 2300 psi | 2300 psi |
| Tear Strength |  |  |  |
| Initiation (per ASTM D1004-66) | 170 pli | 250 pli | 260 pli |
| Propagation (per ASTM D1938-67) | 0.12 lbs at 0.27 mm | 0.12 lbs at 0.37 mm | 1.6 lbs at 0.30 |

EXAMPLE 5A

A prepolymer (Prepolymer VIIA) was prepared from 96.1 gms (0.769 molar equivalents) of 4,4'-diphenylmethane diisocyanate, 277.3 gms (0.384 molar

TABLE 2

|  | II | III | IV | V |
| --- | --- | --- | --- | --- |
| PREPOLYMER |  |  |  |  |
| 4,4'-diphenylmethane diisocyanate Molar equivalents | 1.774 | 11.55 | 3.434 | 1.540 |
| Polyoxyethylene |  |  |  |  |
| Molecular weight | 1450 | 1000 | 1450 | 1450 |
| Molar equivalents | 0.887 | 5.78 | 1.72 | 0.770 |
| Hydroquinone di( -hydroxyethyl)ether Molar equivalents | 0.452 | 2.89 | 0.430 | 0.514 |
| PROPERTIES OF PREPOLYMERS |  |  |  |  |
| Softening Point (TMA) | 77° C. | 102° C. | 23° C. | 95° C. |
| Melting Index: | 7.68 g/10 minutes (2.16 kg at 77° C.) 66.6 g/10 minutes (5.00 kg at 77° C.) | 43.2 g/10 minutes (2.16 kg at 110° C.) 25.3 g/10 minutes (2.16 kg at 105° C.) | 77.5 g/10 minutes (2.16 kg at 38° C.) | 21.8 g/10 minutes (5.00 kg at 105° C.) 23.3 g/10 minutes (2.16 kg at 110° C.) |
| PROPERTIES OF CURED FILMS |  |  |  |  |
| Thickness | 0.06–0.37 mm | 0.08–0.23 mm | 0.16–0.27 mm | 0.30–0.33 mm |
| Tensile Strength at Break (per ASTM D882-81) | 1900 psi | 1800 psi | 1400 psi | 1900 psi |
| Elongation of Break (per ASTM D882-81) | 520 percent | 720 percent | 680 percent | 960 percent |
| Modulus of Elasticity (per ASTM D882-81) | 2300 psi | 3100 psi | 1300 psi | 2300 psi |
| Tear Strength |  |  |  |  |
| Initiation (per ASTM D1004-66) | 250 pli | 290 pli | 170 pli | 260 pli |
| Propagation (per ASTM D1938-67) | 0.12 lbs at 0.37 mm | 0.46 lbs at 0.23 mm | 0.12 lbs at 0.27 mm | 1.6 lbs at 0.30 mm |
| Normalized MVTR (gms/m$^2$ · 24 hours · 2 mil) | 15300 | 7850 | 14200 | 16000 |

EXAMPLE 4

To illustrate the effect of phase-separation on the moisture transmitting characteristics and the physical equivalents) of poly(oxyethylene)glycol having a molecular weight of 1450, and 26.56 gms (0.1922 molar equivalents) of 1,2-bis(2-aminophenylthio)ethane using the following method.

Flaked 4,4'-diphenylmethane diisocyanate was charged to a 1000 ml reactor and allowed to melt under a dry nitrogen purge, by heating and stirring to 80° C. Poly(oxyethylene)glycol at 80° C. was slowly added, with stirring, to the diisocyanate from an addition funnel over a 2 hour period. The poly(oxyethylene)glycol had previously been degassed at 95° C. for 2 hours under reduced pressure. After 60 minutes the free isocyanate was found to be 4.32 percent.

The temperature of the isocyanate capped poly(oxyethylene)glycol formed by the first step was raised to 100° C. 26.56 gms of flaked, 1,2-bis(2-aminophenylthio)-ethane were charged to the reactor. Vigorous stirring and a nitrogen purge was maintained during this step. Immediately the prepolymer changed from colorless to a translucent yellow. In the following fifteen minutes the prepolymer had increased in viscosity. Twenty minutes after the addition of 1,2-bis(2-aminophenylthio)-ethane, the prepolymer was discharged into paint cans, blanketed with nitrogen and sealed. Samples were taken for free isocyanate titrations. At this point, the prepolymer was of high viscosity, a translucent yellow and the free isocyanate was later found to be 2.02 percent. At this point, to avoid undue heat treatment, films were cast and cured for characterization as shown in Table 4A.

Packaged Prepolymer VIIA was found to have a stable isocyanate value and remain workable for at least several days. The physical properties of Prepolymer VIIA were unexpectedly low for urea hard segments. This and the lack of opacity in the prepolymer raised questions as to the suitableness of this hard segment in this system, and these results are presently not fully understood.

TABLE 4A

| PROPERTIES OF PREPOLYMER VIIA | |
|---|---|
| Softening Point (TMA) | 27° C. |
| Melting Index: | |
| 2.16 kg at 50° C. | 25.3 gms/10 minutes |
| 2.16 kg at 60° C. | 46.8 gms/10 minutes |
| PHYSICAL PROPERTIES OF A CURED FILM OF PREPOLYMER VIIA | |
| Thickness | 0.22-0.26 mm |
| Tensile Strength at Break (per ASTM D882-81) | 590 psi |
| Elongation at Break (per ASTM D882-81) | 410 percent |
| Modulus of Elasticity (per ASTM D882-81) | 710 psi |
| Tear Strength | |
| Initiation (per ASTM D1004-66) | 100 pli |
| Propagation (per ASTM D1938-67) | 0.02 lbs at 0.22 mm |

EXAMPLE 5B

A prepolymer (Prepolymer VIIB) of this invention was prepared from 91.90 gms (0.7352 molar equivalents) of 4,4'-diphenylmethane diisocyanate, 182.8 gms (0.3679 molar equivalents) of poly(oxytetramethylene)-glycol having a molecular weight of 1000 and 25.37 gms (0.1836 molar equivalents) of 1,2-bis(2-aminophenylthio)-ethane.

To a 1000 ml reactor equipped with a stirrer and nitrogen purge, the 4,4'-diphenylmethane diisocyanate was charged in solid form. With the nitrogen purging, the temperature of the reactor was raised to 80° C. When the diisocyanate had melted, the poly(oxytetramethylene)glycol was slowly added via an addition funnel over a 50 minute period. The poly(oxytetramethylene)glycol had been previously degassed at 95° C. under reduced pressure. After an additional 45 minutes, the free isocyanate value was found to be 5.3 percent.

The temperature of the reactor was raised to 100° C. and the 1,2-bis(2-aminophenylthio)-ethane added all at once in solid form. After 15 minutes, the prepolymer had turned from colorless to a translucent yellow. At this time, the prepolymer was poured into paint cans and sealed under nitrogen. A titration sample taken at this time had a free isocyanate value of 2.3 percent. It was found to be important to pour the prepolymer immediately after the 1,2-bis(2-aminophenylthio)-ethane had reacted to prevent an undue increase in viscosity. The rapid increase in viscosity is thought to be due to biuret formation occurring at high temperatures. To avoid undue heat treatment, films were cast at this point and cured for characterization as shown in Table 4B.

TABLE 4B

| PROPERTIES OF PREPOLYMER VIIB | |
|---|---|
| Softening Point (TMA) | 95° C. |
| Melting Index: | |
| 2.16 kg at 50° C. | 176.0 gms/10 minutes |
| PHYSICAL PROPERTIES OF A CURED FILM OF PREPOLYMER VIIB | |
| Thickness | 0.10 mm |
| Tensile Strength at Break (per ASTM D882-81) | 5900 psi |
| Elongation at Break (per ASTM D882-81) | 520 percent |
| Modulus of Elasticity (per ASTM D882-81) | 2300 psi |
| Tear Strength | |
| Initiation (per ASTM D1004-66) | 170 pli |
| Propagation (per ASTM D1938-67) | 0.075 lbs at 0.96 mm |

EXAMPLE 6

Prepolymer I provided a successful solvent free adhesive for lamination of a textile and a plastic film utilizing a conventional, direct gravure printer. A dot pattern of Prepolymer I was metered onto an expanded PTFE membrane, product designation PN 11124NA, available from W. L. Gore and Associates, Inc., by a gravure roller in such a manner as to provide coverage of approximately 50 percent of the membrane. The gravure roller was heated to 120° C. and was found to provide a laydown of about 5.5 gms/yard$^2$. The membrane was held against the gravure roller by a low durometer rubber roller at a pressure sufficient to effect removal of the adhesive dots onto the membrane. The printed membrane was transported at 75 fpm for a distance of about 18 inches and laminated to a 3.0 ounce/yard Taslan ® fabric in a nip between a chrome roller heated to 100° C. and a low durometer rubber roller. The phase-separation that had occurred in the prepolymer prevented wicking of the adhesive into the textile. Its softness provided good wetting characteristics. The laminated product was wound onto a core and allowed to cure with ambient moisture. Subsequently, the entire laminate was treated with a water repellent treatment in a standard process.

The laminate thus formed was found to have good hand characteristics due to the controlled adhesive penetration provided by the phase-separation characteristics. The adhesive provided excellent durability as the textile and membrane laminate did not delaminate in over 1500 continuous hours of an ambient temperature, water agitation in a Maytag washer.

EXAMPLE 7

The following example illustrates the situation wherein a non-suitable hard segment is obtained, the prepolymer being outside the scope of this invention.

Using a procedure similar to that described in Example 1, but replacing the 1,4-butanediol there used with 10.14 gms (0.1950 molar equivalents) neopentyl glycol and using 97.65 gms (0.7892 molar equivalents) 4,4'-diphenylmethane diisocyanate and 192.21 gms (0.3906 molar equivalents) of polyoxytetramethylene)glycol of molecular weight 1000, there was prepared a prepolymer containing a non-suitable hard segment.

The prepolymer was observed to a clear high viscosity liquid at room temperature. Furthermore, stored at room temperature the isocyanate value dropped from 2.86 percent isocyanate to 1.34 percent isocyanate in 7 days, illustrating poor shelf stability.

EXAMPLE 8

An attempt was made to prepare a prepolymer outside of the limitation of equation (b) above by the reaction of 176.34 gms (1.41 molar equivalents) 4,4'-diphenylmethane diisocyanate, 252 gms (0.3527 molar equivalents) polyoxyethylene of molecular weight 1450 and 71.67 gms (0.7054 molar equivalents) hydroquinone di($\beta$-hydroxyethyl)ether by a procedure similar to that described in Example 3. Within 30 minutes after the addition of the hydroquinone di($\beta$-hydroxyethyl)ether the prepolymer had essentially gelled and was found to have an isocyanate value of 1.45 percent, well below the theoretical value of 2.96 percent isocyanate.

A second attempt at preparing this prepolymer was made wherein the prepolymer was removed from the reactor 15 minutes after the hydroquinone di($\beta$-hydroxyethyl)ether was added. At this stage the prepolymer was an opaque white, of uniform paste viscosity and found to have an isocyanate value of 4.8 percent, well above the theoretical value. However, the next day the isocyanate value had dropped dramatically to 1.7 percent. It is believed that the formation of allophonate linkages is the explanation for these poor results.

EXAMPLE 9

A prepolymer (Prepolymer VIII) of this invention was prepared from 146.9 g (1.175 molar equivalents) of 4,4'-diphenylmethane diisocyanate, 339.9 g (0.5877 molar equivalents) of 1200 molecular weight polyoxypropylene glycol and 13.20 g (0.2933 molar equivalents) of 1,4-butanediol using the following procedure.

Liquid 4,4'-diphenylmethane diisocyanate was charged to a reactor heated to 80° C. and purged with dry nitrogen. From a jacketed addition funnel, polyoxypropylene glycol at 77° C. was rapidly added to the diisocyanate with stirring. After 3 hours, the free isocyanate was found to be 4.8 percent.

The room temperature 1,4-butanediol was added in one charge to the isocyanate capped polyoxypropylene glycol formed in the first step. After 1.5 hours, the prepolymer turned from colorless to white, and the free isocyanate was found to be 2.3 percent.

The resulting prepolymer was poured warm from the reactor into paint cans, blanketed with nitrogen, and sealed. Characteristics of the prepolymer and films cast therefrom are shown below.

TABLE 5

| PROPERTIES OF PREPOLYMER VIII | |
|---|---|
| Softening Point (TMA) | −2° C. |
| Melting Index: | |
| 2.16 kg at 35° C. | 3.32 gms/10 minutes |
| 2.16 kg at 45° C. | 13.8 gms/10 minutes |
| PHYSICAL PROPERTIES OF A CURED FILM OF PREPOLYMER VIII | |
| Thickness | 0.086 mm |
| Tensile Strength at Break (per ASTM D882-81) | 800 psi |
| Elongation at Break (per ASTM D882-81) | 710 percent |
| Modulus of Elasticity (per ASTM D882-81) | 450 psi |
| Tear Strength | |
| Initiation (per ASTM D1004-66) | 79 pli |
| Propagation (per ASTM D1938-67) | 0.021 lbs at 0.079 mm |

EXAMPLE 10

A coated textile was prepared according to the procedure illustrated in FIG. 2. The prepolymer of choice was preheated to about 110° C. and placed into the puddle 6 created by doctor blade 8 affixed at a gap of approximately 2 mils from the FEP belt 2. The blade was heated to about 120° C., and the belt was heated to approximately 90° C. as it ran in contact with the heated roller 4 maintained at about 120° C. The prepolymer was shaped into a film 10 by the doctor blade onto the belt and allowed to cool as the belt ran against the chilled roller 12 maintained at 0°–10° C. The phase-separated prepolymer film was then laminated to the textile fabric 14 at the nip between rollers 12 and 16. The coated textile composite 18 was released from the belt as it was pulled over peel bar 20 to define the angle of release, approximately 90°. The coated textile was then rolled up with release paper and allowed to cure. In this example, the coated textile made with Prepolymer V was subsequently treated on the textile side with a fluorocarbon water repellent treatment. The coated textiles were characterized as shown in Table 6 below.

TABLE 6

| PREPOLYMER | III | V |
|---|---|---|
| TASLAN | | |
| Weight | 3 ounces/yard | 3 ounces/yard |
| Thickness | 9.0 mils | 9.0 mils |
| MVTR (gms/m² · 24 hours) | 15300 | 15300 |
| COATED TASLAN | | |
| Total Thickness (mils) | 11.4 | 12.4 |
| MVTR (gms/m² · 24 hours) | 3230 | 3530 |
| WEP (psi, per Federal Standard 191, Method 5512) | 121 | 191 |
| Abrasion (cycles) | >4000 | >4000 |

In addition, the coated product was found to be durably waterproof under scoring and flexing tests. As such, this coated product would provide for an excellent rain protective wear.

EXAMPLE 11

A layered article as disclosed in U.S. Pat. No. 4,194,041 was made from Prepolymer II above and an expanded PTFE membrane, product designation PN 11124NA, available from W. L. Gore & Associates, Incorporated having a Gurley number of about 5 seconds, bubble point of about 23 psi, thickness of about 38 mm and a weight of about 10 gms/m².

A three roller assembly was employed, all rollers heated to 95° C. and Prepolymer II was heated to 95° C. A continuous film of uniform thickness of Prepolymer IV was formed on the middle roller via the puddle formed at the nip between the first roller and second roller. In this case, the first roller was a gravure roller, and the second roller a rubber roller. Hydraulic pressure generated between the rubber roller and the backing roller was adjusted to drive the prepolymer into the matrix of the expanded PTFE membrane being fed into the coater at 20 fpm. The composite was rolled up with release paper and allowed to cure in ambient air.

The layered article was laminated to a 3 ounce/yard² Taslan fabric by adhesive applied in a dot pattern so as not to occlude more than half of the membrane surface area. The layered article was laminated so as to expose the cured Prepolymer II face. The laminate was characterized as shown in Table 7.

TABLE 7

| LAYERED ARTICLE LAMINATE | |
|---|---|
| Prepolymer IV Laydown | 18 gms/m² |
| Expanded PTFE Membrane | 16 gms/m² |
| MVTR (gms/m² · 24 hours) | 10,755 |
| Abrasion (cycles) | 1500 |

The laminate was further found to be highly durable to flexing and scoring. As such, this laminate would provide for excellent rain protective wear.

EXAMPLE 12

Prepolymer I was found to be effective as a sealant when applied in the molten state to a raw material leak at a hole between a metal pipe and a steel drum. The phase-separation allowed the prepolymer to instantly set up and then subsequently cure with ambient moisture. The sealant proved effective.

EXAMPLE 13

To illustrate further the versatility of the prepolymers of this invention, a flat, electrical cable jacketing formulation was found to be enhanced in its physical properties, particularly tear strength, when a small amount of Prepolymer I was incorporated. Prepolymer I provided characteristics, particularly its low melt temperature, that allowed easy processing in an already existent formulation. Samples of the cable jacketing material were prepared with and without Prepolymer I in accordance with Table 8. The compounds were mixed on a two-roller, 9"×18" mill in two stages.

Stage one consisted of combining ingredients numbered 1 through 5 of Table 8 on the mill at a temperature between 20° C. and 100° C. When the mixing was deemed to be complete, i.e. complete incorporation and dispersion of the ingredients, the material was removed from the mill as a sheet and allowed to cool below 50° C. The mill was subsequently allowed to cool to below 50° C.

Stage two consisted of returning the cooled sheet from stage 1 to the cooled mill and subsequently adding ingredients 6 through 9 of Table 8 and allowing the ingredients to be incorporated into the rubber mix.

The mill temperature during this process stage was maintained in the range of 20° C. and 80° C.

The sheet was removed from the mill and subsequently molded into sheets of 0.5 to 3 mm thickness at a pressure between 500 pounds per square inch and 2000 pounds per square inch between the heated platens of a hydraulic press. The temperature of the platens was maintained at 180° C. throughout the molding time of 30 minutes. After 30 minutes the mold was depressurized, the molded sheet removed and the sheet allowed to cool to a temperature of 20 plus or minus 3° C. for a minimum of 16 hours. The samples were characterized as shown in Table 8.

TABLE 8

| | Sample A | Sample B |
|---|---|---|
| ALL PARTS BY WEIGHT | | |
| Ethylene Acrylic Resin | 100 | 100 |
| Ethylene Vinyl Acetate Resin | 15 | 15 |
| Prepolymer I | — | 10 |
| Alumina Trihydrate | 150 | 150 |
| Associated Stabilizers, Processing Aids | 6.5 | 6.5 |
| Diphenyl Guanidine | 2.5 | 2.5 |
| Hexamethylene Diamine Carbamate | 1.25 | 1.25 |
| Dicumyl Peroxide | 3 | 3 |
| Associated Stabilizers, Processing Aids | 11 | 11 |
| PHYSICAL PROPERTIES OF CABLE JACKETING | | |
| Tensile Strength (per ASTM D882-81) | 1400 psi | 1400 psi |
| Elongation at Break (per ASTM D882-81) | 170 percent | 293 percent |
| Tear Strength (per ASTM D1004-66) | 22 pli | 37 pli |

The above examples were for the purpose of illustrating and further teaching the present invention and included the best mode presently known of carrying it out. It must be emphasized, however, that the examples given herein were purely illustrative in character and that this invention is not to be limited to the details set out therein, because variations in the examples are possible without departing from the scope, spirit, or intention of the invention, as will be obvious to those skilled in this art.

What is claimed is:

1. A reactive, 100 percent solids, storage stable segmented, phase-separating polyurethane prepolymer having soft segments and suitable hard segments comprising the reaction product of:
   (i) a polyol (A) having a number average molecular weight of from about 600 to about 3500 and having a functionality of at least 2;
   (ii) an isocyanate (B) having a functionality of at least 2; and
   (iii) a low molecular weight chain extender (C) having a molecular weight in a range lower than about 500 and having a functionality of at least 2, wherein the reactants are employed in such proportions so as to satisfy the following equations:

$$\frac{Eq_{NCO}}{Eq_{OH} + Eq_{CE}} \geq 1.1 \quad (a)$$

$$Eq_{OH} \geq Eq_{CE} \quad (b)$$

$$Eq_{CE} > 0, \quad (c)$$

wherein $Eq_{NCO}$ denotes the equivalents of the isocyanate species employed, and $Eq_{OH}$ and $Eq_{CE}$ denote the respective molar equivalents of the polyol and chain extender employed, said soft segments provided by the polyol and said suitable hard segments provided by the reaction product of the isocyanate and chain extender and which induce phase-separation of said hard and soft segments in said prepolymer as a result of thermodynamic incompatibility between said hard and soft segments, said prepolymer being an opaque solid at room temperature.

2. The composition of claim 1 wherein said polyol is selected from the group consisting of poly(alkylene ethers), polyesters, polycaprolactones, hydroxyl terminated polyester-amides, polycarbonates, polybutadienes or copolymers thereof.

3. The composition of claim 1 wherein said polyol is a poly(alkylene ether).

4. An adhesive of the composition of claim 1.

5. A sealant of the composition of claim 1.

6. A coating on a substrate of the composition of claim 1.

7. The coating of claim 6 on a fabric substrate.

8. A shaped article of the composition of claim 1.

9. The shaped article of claim 8 having green strength exceeding about 0.5 pli.

10. The shaped article of claim 8 obtained by molding.

11. The shaped article of claim 8 in the form of a film.

12. The shaped article of claim 8 in the form of a tube.

13. The shaped article of claim 8 in the form of a rod.

14. Electrical cable jacketing including the composition of claim 1.

15. The prepolymer of claim 1 which is melt processible.

16. The prepolymer of claim 1 which is low temperature melt processible.

17. The cured polymer comprising the product obtained by curing the prepolymer of claim 1.

18. The adhesive of claim 4 which is cured.

19. The sealant of claim 5 which is cured.

20. The coated substrate of claim 6 wherein said coating is cured.

21. The coated fabric of claim 7 wherein the coating is cured.

22. The shaped article of claim 8 which is cured.

23. The shaped article of claim 10, 12 or 13 which is cured.

24. The film of claim 11 which is cured.

25. The film of claim 24 having a tensile strength in at least one direction exceeding 500 psi.

26. The film of claim 24 having an elongation greater than 200 percent.

27. The film of claim 24 having high abrasion resistance.

28. The film of claim 24 having a tear initiation strength exceeding 170 pli.

29. The film of claim 24 having a tear propagation strength exceeding 0.10 lbs at 0.30 mm thickness.

30. The film of claim 24 wherein said polyol is polyoxyethylene, said film having a moisture vapor transmission rate exceeding 5000 gms/m$^2 \cdot$24 hours$\cdot$2 mils.

31. The film of claim 24 wherein said polyol is polyoxyethylene, said film having a moisture vapor transmission rate exceeding 10000 gms/m$^2 \cdot$24 hours$\cdot$2 mils.

32. The film of claim 24 wherein said polyol is polyoxyethylene, said film having a moisture vapor transmission rate exceeding 15000 gms/m$^2 \cdot$24 hours$\cdot$2 mils.

33. The coated fabric of claim 21 wherein said polyol is polyoxyethylene, said coated fabric having a moisture vapor transmission rate exceeding 3000 gms/m$^2 \cdot$24 hours.

34. The coated fabric of claim 21 wherein said polyol is polyoxyethylene, said coated fabric having a moisture vapor transmission rate exceeding 50 percent that of said fabric alone.

35. The coated fabric of claim 21 wherein said polyol is polyoxyethylene, said coated fabric having a moisture vapor transmission rate exceeding 75 percent that of said fabric alone.

36. The coated fabric of claim 21 wherein said polyol is polyoxyethylene, said coated fabric having a moisture vapor transmission rate comparable to the fabric alone.

37. The prepolymer of claim 15 wherein said chain extender is a glycol.

38. The prepolymer of claim 15 wherein said chain extender is an aromatic diamine.

39. The prepolymer of claim 15 wherein said chain extender is an alkanolamine.

40. The prepolymer of claim 15 wherein said chain extender is a hydroxy arylamine.

41. The prepolymer of claim 15 wherein said chain extender is an aliphatic diamine.

42. The prepolymer of claim 15 wherein said chain extender is a combination of chain extenders selected from the class consisting of aromatic diamines, aliphatic diamines, glycols, alkanolamines and hydroxy acylamines.

43. The coated substrate of claim 6 wherein said substrate is expanded polytetrafluoroethylene.

44. The cured polymer of claim 17 being a thermoplastic polyurethane having a melt processing temperature substantially in excess of the melt processing temperature of said prepolymer.

45. The film of claim 27 wherein the polyol is polyoxyethylene and said abrasion resistance exceeds 1000 cycles.

46. The prepolymer of claim 1 having storage stability exceeding one month.

47. The electrical cable jacketing of claim 14 wherein said composition is cured.

48. The prepolymer of claim 1 comprising the reaction product of:
(i) a polyol (A) having a number average molecular weight of from about 600 to about 3500;
(ii) a diisocyanate (B); and
(III) a low molecular weight bifunctional chain extender (C) having a molecular weight in a range lower than about 500.

49. The cured polymer comprising the product obtained by curing the prepolymer of claim 48.

50. The prepolymer of claim 1 comprising the reaction product of:
(a) a poly(alkylene ether)glycol (A) having a number average molecular weight of from about 600 to about 3500;
(ii) a diisocyanate (B); and
(iii) a low molecular weight bifunctional chain extender (C) having a molecular weight in a range lower than about 500.

51. The cured polymer comprising the product obtained by curing the prepolymer of claim 50.

52. The coated substrate of claim 20 wherein said substrate is expanded polytetrafluoroethylene.

53. The film of claim 27 wherein the polyol is polyoxyethylene and said abrasion resistance exceeds 4000 cycles.

54. The film of claim 24 having a tensile strength in at least one direction exceeding 1000 psi.

55. The film of claim 24 having a tensile strength in at least one direction exceeding 2000 psi.

56. The film of claim 24 having a tensile strength in at least one direction exceeding 5000 psi.

57. The shaped article of claim 22 having a tensile strength in at least one direction exceeding 500 psi.

58. The film of claim 24 having a tear propagation strength exceeding 0.02 lbs at 0.20 mm thickness.

59. The shaped article of claim 22 having a tensile strength in at least one direction exceeding 5000 psi.

* * * * *